(12) United States Patent
Suzuki et al.

(10) Patent No.: US 12,498,480 B2
(45) Date of Patent: Dec. 16, 2025

(54) DISTANCE MEASURING DEVICE

(71) Applicants: DENSO CORPORATION, Kariya (JP); MIRISE Technologies Corporation, Nisshin (JP); TOYOTA JIDOSHA KABUSHIKI KAISHA, Toyota (JP)

(72) Inventors: Taku Suzuki, Nisshin (JP); Masashige Sato, Nisshin (JP); Koichi Oyama, Nisshin (JP); Yoshiki Matsumoto, Kariya (JP)

(73) Assignees: DENSO CORPORATION, Kariya (JP); MIRISE Technologies Corporation, Nisshin (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 946 days.

(21) Appl. No.: 17/695,882

(22) Filed: Mar. 16, 2022

(65) Prior Publication Data
US 2022/0317299 A1    Oct. 6, 2022

(30) Foreign Application Priority Data
Apr. 2, 2021  (JP) ................. 2021-063566

(51) Int. Cl.
*G01S 17/34*  (2020.01)
*G01S 7/481*  (2006.01)
*G01S 17/08*  (2006.01)

(52) U.S. Cl.
CPC .......... *G01S 17/34* (2020.01); *G01S 7/4817* (2013.01); *G01S 17/08* (2013.01)

(58) Field of Classification Search
CPC ......... G01S 17/34; G01S 7/4817; G01S 17/08
See application file for complete search history.

(56) References Cited

U.S. PATENT DOCUMENTS

| 10,401,495 B2 | 9/2019 | Crouch et al. |
| 2011/0051146 A1 | 3/2011 | Jensen et al. |
| (Continued) | | |

FOREIGN PATENT DOCUMENTS

| CN | 107505626 B | 6/2019 |
| CN | 110212987 B | 8/2020 |

OTHER PUBLICATIONS

Zhongyang Xu et al., "FMCW Lidar Using Phase-Diversity Coherent Detection to Avoid Signal Aliasing", IEEE Photonics Technology Letters, vol. 31, No. 22, Nov. 15, 2019, pp. 1822-1825, retrieved on Feb. 18, 2020.

(Continued)

*Primary Examiner* — Luke D Ratcliffe
*Assistant Examiner* — Joseph C Fritchman
(74) *Attorney, Agent, or Firm* — Posz Law Group, PLC

(57) ABSTRACT

A distance measuring device includes: a modulated light output unit configured to output a modulated light; a transmitting scanner configured to emit an input light, which is one branched light of the modulated light, as an emitted light; a receiving scanner into which the emitted light reflected by a target object is incident as an incident light, the receiving scanner outputting the incident light as a reflected light; and a measuring unit configured to measure a distance to the target object by combining the reflected light and a reference light which is the other branched light of the modulated light. The modulated light output unit outputs at least two modulated lights having modulation frequencies different from each other by chirping the modulation frequencies to approach each other.

11 Claims, 18 Drawing Sheets

(56) References Cited

U.S. PATENT DOCUMENTS

| | | | |
|---|---|---|---|
| 2011/0292403 A1* | 12/2011 | Jensen | G01B 11/026 |
| | | | 356/498 |
| 2019/0317194 A1 | 10/2019 | Chong | |
| 2019/0317199 A1 | 10/2019 | Chong | |
| 2019/0377089 A1 | 12/2019 | Rohner | |
| 2021/0026015 A1* | 1/2021 | Davydenko | G01S 7/4817 |
| 2021/0063549 A1 | 3/2021 | Chong | |
| 2021/0132226 A1* | 5/2021 | Rezk | G01S 7/4817 |
| 2021/0293960 A1* | 9/2021 | Kreitinger | G01S 7/4815 |
| 2021/0405194 A1 | 12/2021 | Tsuchida | |
| 2022/0146411 A1* | 5/2022 | Lombard | G01N 21/31 |

OTHER PUBLICATIONS

J. C. Hulme et al., "Fully integrated hybrid silicon two dimensional beam scanner", Optics Express vol. 23, No. 5, P5862, 2015.

* cited by examiner

DISTANCE MEASURING DEVICE

CROSS REFERENCE TO RELATED APPLICATION

This application is based on Japanese Patent Application No. 2021-063566 filed on Apr. 2, 2021, the disclosure of which is incorporated herein by reference.

TECHNICAL FIELD

The present disclosure relates to a distance measuring device.

BACKGROUND

A laser imaging detection and ranging (LiDAR) is developed for the purpose of application to an environment recognition sensor for automobiles and autonomous robots and a shape measurement at construction and civil engineering sites.

SUMMARY

According to an aspect of the present disclosure, in a distance measuring device, a transmitting scanner emits an input light, which is one branched light of a modulated light, into a space as an emitted light. The modulated light is provided by modulating an oscillating light of a laser light source. A receiving scanner into which the emitted light reflected by a target object is incident as an incident light outputs the incident light as a reflected light. The measuring unit is configured to measure a distance to the target object by combining the reflected light and a reference light which is the other branched light of the modulated light.

The transmitting scanner has frequency dependence in which an emission angle of the emitted light depends on a frequency of the input light. The modulated light output unit outputs at least two modulated lights having different modulation frequencies from each other by chirping the modulation frequencies to approach each other.

DETAILED DESCRIPTION

Figure 1:
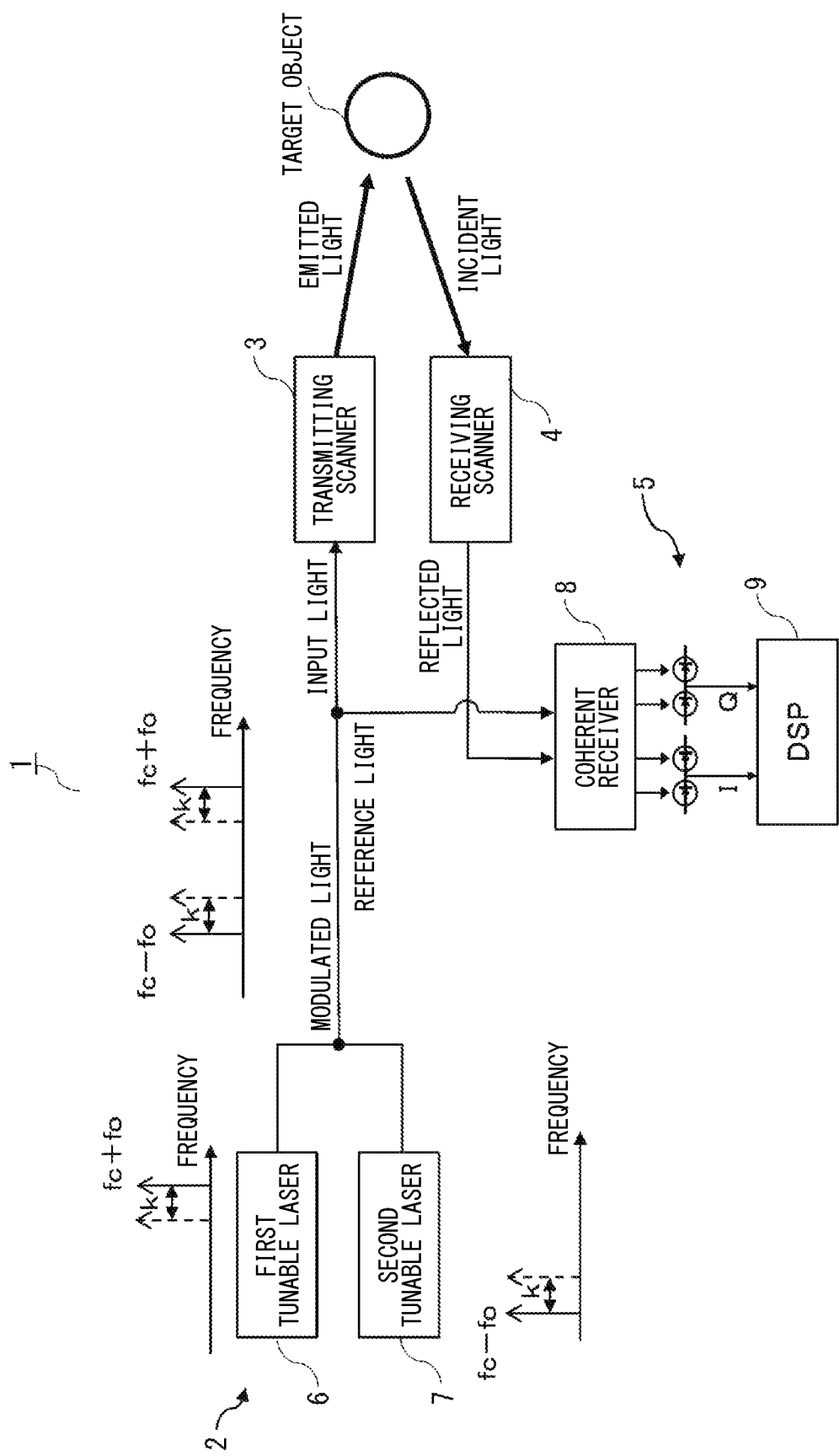
FIG. 1 is a functional block diagram showing a distance measuring device according to a first embodiment.

To begin with, examples of relevant techniques will be described.

A laser imaging detection and ranging (LiDAR) is developed for the purpose of application to an environment recognition sensor for automobiles and autonomous robots and a shape measurement at construction and civil engineering sites. A frequency modulated continuous wave (FMCW) ranging device uses coherent detection. In the FMCW method, a light reflected by a target object can be detected with high sensitivity. Not only the distance to the target object but also a speed of the target object can be measured.

However, in the FMCW method, it is necessary to expand the chirp band to some extent so as to improve the distance resolution and the frame rate. However, if the chirp band is expanded too much in case where a transmitting scanner is used to emit two or more emitted lights into a space and has a frequency dependence on the emission angle, the spatial resolution becomes large. When the size of the target object is small, it is highly possible that all of the emitted lights do not hit the target object.

The present disclosure provides a distance measuring device capable of appropriately measuring a distance to a target object by increasing the distance resolution and the frame rate and suppressing increase in the spatial resolution.

According to an aspect of the present disclosure, in a distance measuring device, a transmitting scanner emits an input light, which is one branched light of a modulated light, into a space as an emitted light. The modulated light is provided by modulating an oscillating light of a laser light source. A receiving scanner into which the emitted light reflected by a target object is incident as an incident light outputs the incident light as a reflected light. The measuring unit is configured to measure a distance to the target object by combining the reflected light and a reference light which is the other branched light of the modulated light. The transmitting scanner has frequency dependence in which an emission angle of the emitted light depends on a frequency of the input light. The modulated light output unit outputs at least two modulated lights having different modulation frequencies from each other by chirping the modulation frequencies to approach each other so that the modulation frequencies become a same at a same time.

Using the transmitting scanner having the frequency dependence in which the emission angle of the emitted light depends on a frequency of the input light, the modulated lights are output by chirping the modulation frequencies to approach each other so that the modulation frequencies of the two modulated lights are the same at the same time. The chirp band can be expanded to twice the maximum RF center frequency band, and the distance resolution and frame rate can be improved. Further, the emission angle emitted from the transmitting scanner does not widen beyond the initial value, such that an increase in spatial resolution can be suppressed. As a result, the distance to the target object to be measured can be appropriately measured by increasing the distance resolution and the frame rate and suppressing the increase in the spatial resolution.

According to another aspect of the present disclosure, in a distance measuring device, a transmitting scanner emits an input light, which is one branched light of a modulated light, into a space as an emitted light. The modulated light is provided by modulating an oscillating light of a laser light source. A receiving scanner into which the emitted light reflected by a target object is incident as an incident light outputs the incident light as a reflected light. The measuring unit is configured to measure a distance to the target object by combining the reflected light and a reference light which is the other branched light of the modulated light. The transmitting scanner has frequency dependence in which an emission angle of the emitted light depends on a frequency of the input light. The modulated light output unit outputs at least two modulated lights having different modulation frequencies from each other by chirping the modulation frequencies to approach each other so that the modulation frequencies do not become a same at a same time.

Using the transmitting scanner having the frequency dependence in which the emission angle of the emitted light depends on a frequency of the input light, the modulated lights are output by chirping the modulation frequencies to approach each other so that the modulation frequencies of the two modulated lights are not the same at the same time. The chirp band can be expanded to twice the maximum RF center frequency band, and the distance resolution and frame rate can be improved. Further, the emission angle emitted from the transmitting scanner does not widen beyond the initial value, such that an increase in spatial resolution can be suppressed. As a result, the distance to the target object to be measured can be appropriately measured by increasing the distance resolution and the frame rate and suppressing the increase in the spatial resolution.

Hereinafter, embodiments will be described with reference to the drawings. In the embodiments, elements corresponding to those which have been described in the preceding embodiments are denoted by the same reference numerals, and redundant description may be omitted.

First Embodiment

Figure 2:
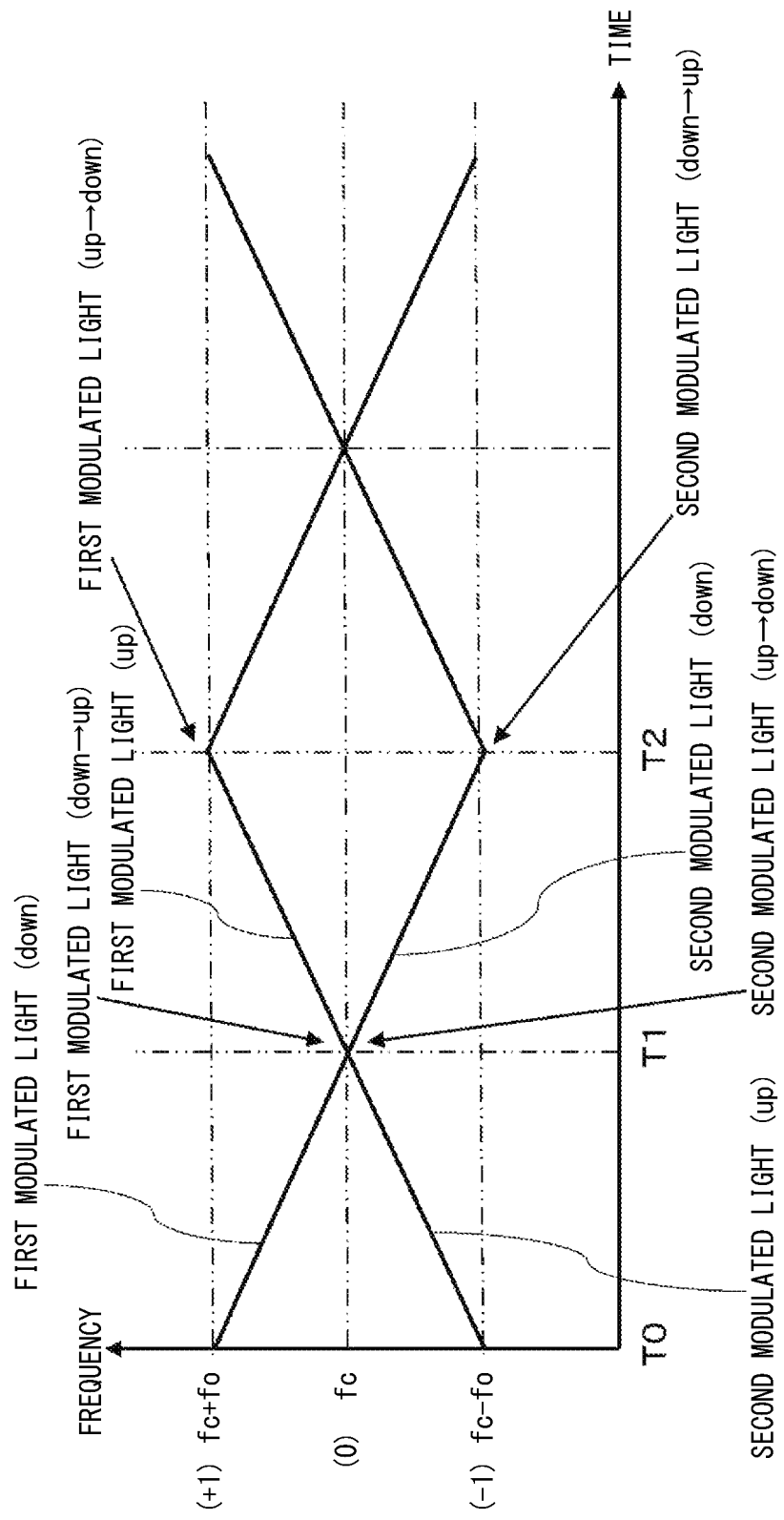
FIG. 2 is a diagram showing a change in frequency of modulated lights.

A first embodiment will be described with reference to FIGS. 1 to 2. A distance measuring device 1 is installed in, for example, an automobile for the purpose of detecting other vehicles or pedestrians around the automobile as a target object so as to ensure a safe and secure driving by avoiding collisions. As shown in FIG. 1, the distance measuring device 1 includes a modulated light output unit 2, a transmitting scanner 3, a receiving scanner 4, and a measuring unit 5. The modulated light output unit 2 includes a first tunable laser 6 and a second tunable laser 7. The measuring unit 5 includes a coherent receiver 8 and a digital signal processor (DSP) 9. The first tunable laser 6 and the second tunable laser 7 correspond to a laser light source, and the wavelength is variable.

Each of the first tunable laser 6 and the second tunable laser 7 is, for example, a distributed feedback (DFB) laser, a distributed bragg reflector (DBR) laser, or an external resonance laser. The first tunable laser 6 outputs a modulated light whose modulation frequency is up-chirped or down-chirped on the high-frequency band side of the carrier frequency. The second tunable laser 7 outputs a modulated light whose modulation frequency is up-chirped or down-chirped on the low-frequency band side of the carrier frequency. That is, when the carrier frequency is fc, the RF center frequency is fo, the RF chirp band is k, and the time is t, the modulation frequency f1 of the modulated light output by the first tunable laser 6 is f1=fc+fo±kt, and the modulation frequency f2 of the modulated light output by the second tunable laser 7 is f2=fc−fo±kt.

As will be described later, the first tunable laser 6 and the second tunable laser 7 output the modulated lights modulated so that the modulation frequencies of the modulated lights approach to each other. Therefore, the chirp rate of f1 and the chirp rate of f2 are opposite from each other when modulated by kt. The "±" in the formula of f1=fc+fo±k means "plus or minus", and the "±" in the formula of f2=fc−fo±kt means "minus or plus".

The modulated light output from the first tunable laser 6 and the second tunable laser 7 is branched into an input light and a reference light. The input light is input to the transmitting scanner 3, and the reference light is input to the coherent receiver 8. When the input light is input from the first tunable laser 6 and the second tunable laser 7, the transmitting scanner 3 irradiates the space with the input light as emitted light. The transmitting scanner 3 has frequency dependence, and the emission angle of the emitted light depends on the frequency of the input light. When the emitted light emitted from the transmitting scanner 3 hits the target object and reflected, the reflected light is incident on the receiving scanner 4 as incident light. When the incident light is incident on the receiving scanner 4, the receiving scanner 4 outputs the incident light as reflected light to the coherent receiver 8. Each of the transmitting scanner 3 and the receiving scanner 4 is, for example, an optical phased array (OPA).

When the reflected light is input to the coherent receiver 8 from the receiving scanner 4, the coherent receiver 8 combines the reflected light with the reference light input from the first tunable laser 6 and the second tunable laser 7 to obtain and output a beat signal. In this case, a frequency difference occurs between the reflected light and the reference light due to a time difference according to the distance from the distance measuring device 1 (own device) to the target object, and the frequency difference is included in the beat signal.

The in-phase component I and the orthogonal signal Q of the beat signal is input to the DSP 9 from the coherent receiver 8. The DSP converts the in-phase component I and the orthogonal signal Q into a digital signal, and calculates the phase and frequency of the beat signal. The DSP 9 calculates the average value of the frequency, calculates the Doppler shift, and calculates the speed of the target object. Further, the DSP 9 removes the Doppler shift component from the phase, and calculates the average value of the absolute values of the phase. The DSP 9 calculates the distance from the own device to the target object based on the relationship between the average value of the absolute values of the phase and a distance stored in advance.

In the distance measuring device 1, the first tunable laser 6 and the second tunable laser 7 modulate and output the modulated light as follows. The first modulated light output by the first tunable laser 6 has the initial value "fc+fo" as +1 order frequency. The second modulated light output by the second tunable laser 7 has the initial value "fc−fo" as −1 order frequency. As shown in FIG. 2, the first tunable laser 6 outputs the first modulated light by linearly down-chirping the modulation frequency from "fc+fo" to "fc" in the time period from T0 to T1. The second tunable laser 7 outputs the second modulated light by linearly up-chirping the modulation frequency from "fc−fo" to "fc" in the time period from T0 to T1. After that, the first tunable laser 6 outputs the first modulated light by linearly up-chirping the modulation frequency from "fc" to "fc+fo" in the time period from T1 to T2. The second tunable laser 7 outputs the second modulated light by linearly down-chirping the modulation frequency from "fc" to "fc−fo" in the time period from T1 to T2. That is, the first tunable laser 6 and the second tunable laser 7 output the modulated lights modulated so that the modulation frequency of the first modulated light and the modulation frequency of the second modulated light approach to each other, and the chirp directions are switched at the timing when the modulation frequency of the first modulated light and modulation frequency of the second modulated light become the same.

By controlling the modulation outputs of the first modulated light and the second modulated light, the chirp band, which is a band from the +1 order frequency to the −1 order frequency, can be expanded to twice the maximum RF center frequency band, which is a band from the 0 order frequency to the +1 order frequency or the −1 order frequency. Thus, the distance resolution and frame rate can be improved. Further, the chirp band is suppressed within a band from the +1 order frequency to the −1 order frequency. Therefore, the emission angle of the emitted light emitted from the transmitting scanner 3 does not widen beyond the initial value, and the increase in spatial resolution can be suppressed.

According to the first embodiment, the following effects can be obtained.

In the distance measuring device 1, the transmitting scanner 3 in which the emission angle of the emitted light has a frequency dependence on the input light is used to chirp the modulation frequencies in directions approaching each other, so that the modulation frequency of the first modulated light and the modulation frequency of the second modulated light are the same at the same time. The chirp band can be expanded to twice the maximum RF center frequency band, and the distance resolution and frame rate can be improved. Further, the emission angle emitted from the transmitting scanner 3 does not widen beyond the initial value, and an increase in spatial resolution can be suppressed. As a result, it is possible to appropriately measure the distance from the own device to the target object and the speed of the target object by increasing the distance resolution and the frame rate and suppressing the increase in the spatial resolution, by using the first tunable laser 6 and the second tunable laser 7, without using an external modulator.

Second Embodiment

Figure 3:
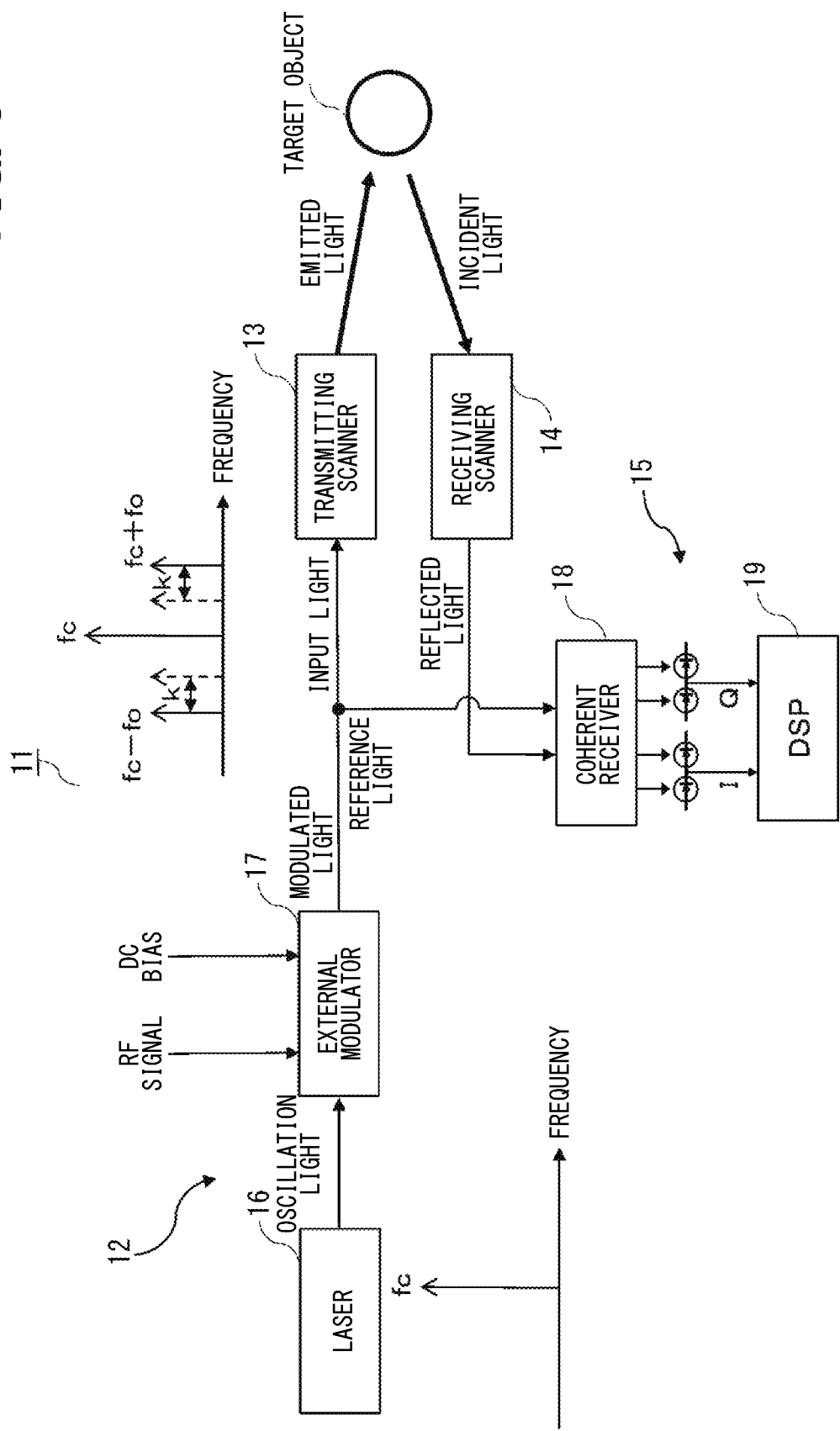
FIG. 3 is a functional block diagram showing a distance measuring device according to a second embodiment.

A second embodiment will be described with reference to FIGS. 3 to 9. The first embodiment uses two tunable lasers, e.g., the first tunable laser 6 and the second tunable laser 7. In the second embodiment, one laser and an external modulator are used. As shown in FIG. 3, the distance measuring device 11 includes a modulated light output unit 12, a transmitting scanner 13, a receiving scanner 14, and a measuring unit 15. The modulated light output unit 12 includes a laser 16 and an external modulator 17. The measuring unit 15 includes a coherent receiver 18 and a DSP 19. The laser 16 corresponds to a laser light source. The transmitting scanner 13, the receiving scanner 14, the coherent receiver 18, and the DSP 19 are equivalent to the transmitting scanner 3, the receiving scanner 4, the coherent receiver 8, and the DSP 9, respectively, described in the first embodiment.

The laser 16 outputs an oscillating light having a predetermined frequency to the external modulator 17. The external modulator 17 is, for example, a Mach-Zender modulator. When an oscillating light is input from the laser 16 to the external modulator 17, the oscillating light is externally modulated based on an RF signal (AC signal) and a DC bias input from the outside. The external modulator 17 outputs modulated lights with modulation frequencies up-charped or down-charped relative to a predetermined frequency on the high-frequency band side and the low-frequency band side. That is, when the carrier frequency corresponding to the predetermined frequency is fc, the RF center frequency is fo, the RF chirp band is k, and the time is t, as in the first embodiment, the modulation frequencies f1 and f2 of the modulated lights output by the external modulator 17 are as follows:

$$f1 = fc + fo \pm kt;\ \text{and}$$

$$f2 = fc - fo \pm kt.$$

The modulated light output from the external modulator 17 is branched into an input light and a reference light as in the first embodiment. The input light is input to the receiving scanner 14, and the reference light is input to the coherent receiver 18. The transmitting scanner 13, the receiving scanner 14, the coherent receiver 18, and the DSP 19 perform the same processing as in the first embodiment.

Figure 4:
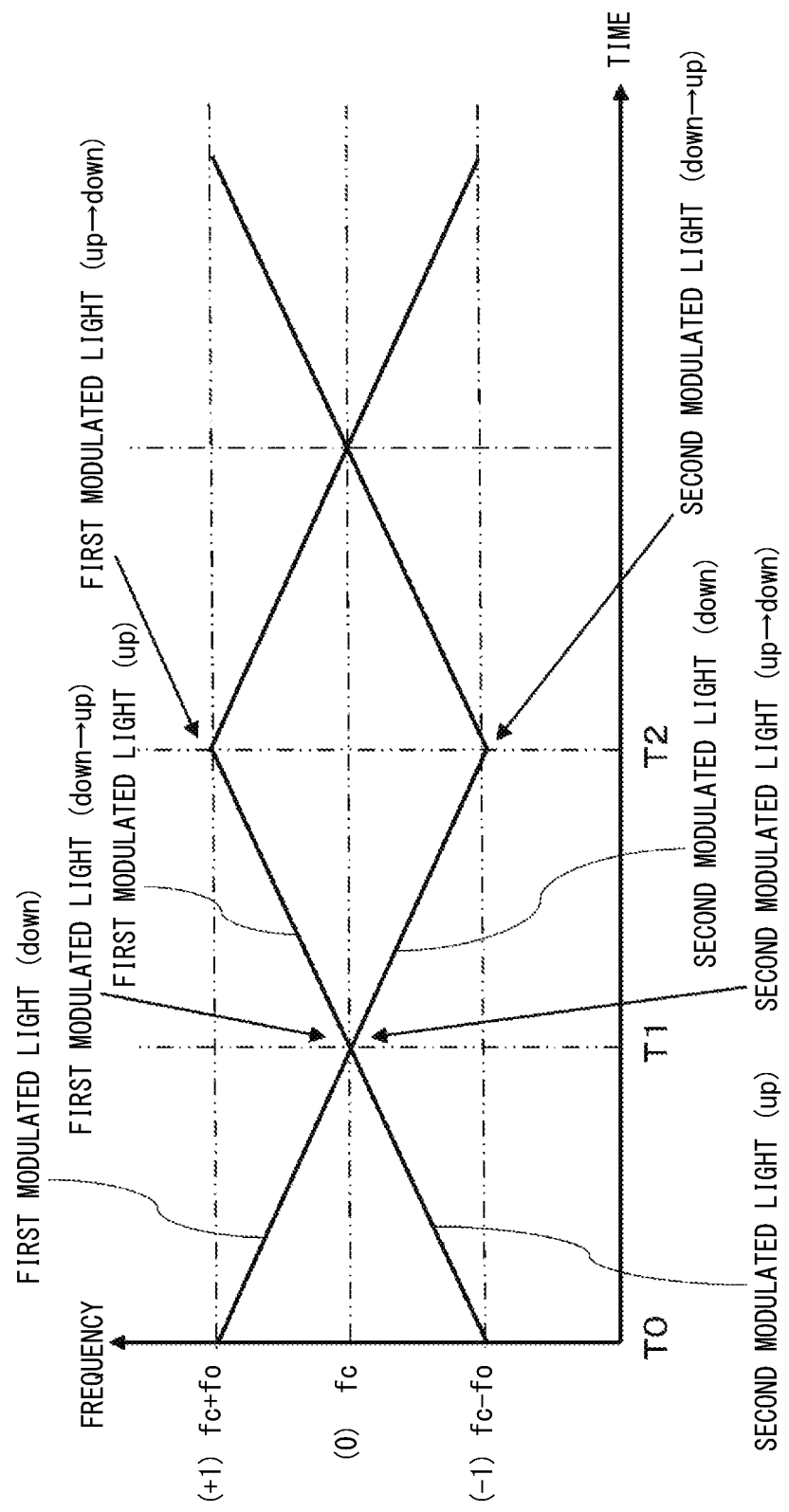
FIG. 4 is a diagram showing a change in frequency of modulated lights.

In the distance measuring device 11, the external modulator 17 modulates and outputs the modulated lights as follows. The first modulated light has "fc+fo" as the initial value as the +1 order frequency, and the second modulated light has "fc−fo" as the initial value as the −1 order frequency. As shown in FIG. 4, the external modulator 17 linearly down-chirps and outputs the modulation frequency of the first modulated light from "fc+fo" to "fc" in the time period from T0 to T1. The external modulator 17 linearly up-chirps and outputs the modulation frequency of the second modulated light from "fc−fo" to "fc" in the time period from T0 to T1. After that, the external modulator 17 linearly up-chirps and outputs the modulation frequency of the first modulated light from "fc" to "fc+fo" in the time period from T1 to T2, and linearly down-chirps and outputs the modulation frequency of the second modulated light from "fc" to "fc−fo" in the time period from T1 to T2. That is, in the external modulator 17, the first modulated light and the second modulated light are modulated and output, similarly to the first embodiment in which the first tunable laser 6 and the second tunable laser 7 modulate and output the first modulated light and the second modulated light, respectively.

In this case, the external modulator 17 can control the chirp rate of the modulation frequency by changing the frequency of the RF signal, and can suppress the output of the carrier frequency by adjusting the DC bias, so as to maintain the balance of the modulation frequency. In the first embodiment, since the first tunable laser 6 that outputs the first modulated light and the second tunable laser 7 that outputs the second modulated light are separate, it is not easy to make the down-chirp rate of the modulation frequency of the first modulated light and the down-chirp rate of the modulation frequency of the second modulated light to match the up-chirp rate of the modulation frequency of the second modulated light and the up-chirp rate of the modulation frequency of the first modulated light. In contrast, the linearity of the chirp rate can be ensured by using the external modulator 17 to flexibly control the chirp rate. Further, the measurement accuracy can be improved by suppressing the output of the carrier frequency which becomes noise when measuring the distance from the own device to the target object and the speed of the target object.

The external modulator 17 may modulate and output the modulated lights with waveform different from the waveform shown in FIG. 4.

Figure 5:
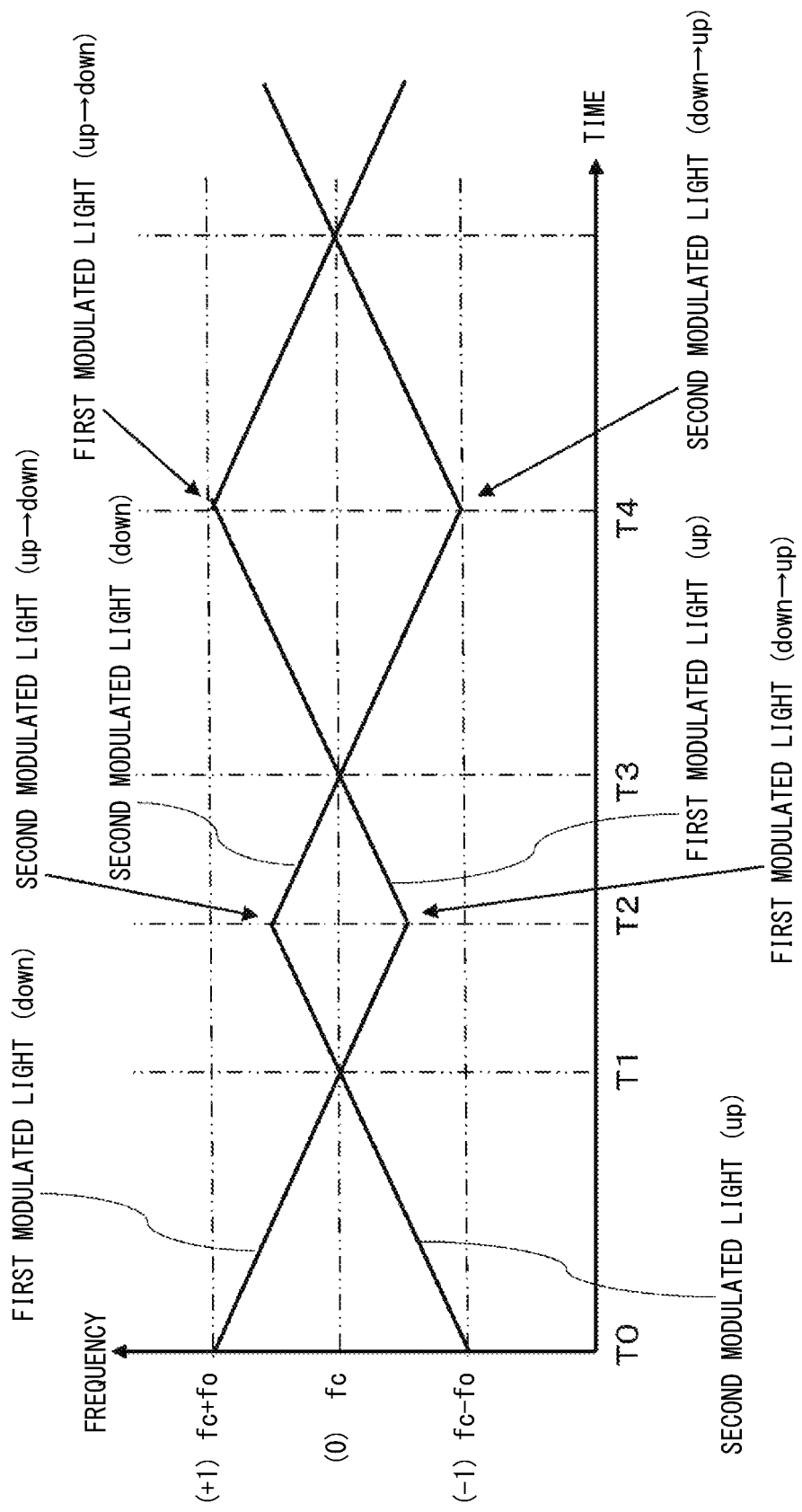
FIG. 5 is a diagram showing a change in frequency of modulated lights.

As shown in FIG. 5, the external modulator 17 linearly down-chirps the modulation frequency of the first modulated light from "fc+fo" to a frequency lower than "fc" in the time period from T0 to T2, and linearly up-chirps the modulation frequency of the second modulated light from "fc−fo" to a frequency higher than "fc" in the time period from T0 to T2. After that, the external modulator 17 linearly up-chirps the modulation frequency of the first modulated light from the frequency below "fc" to "fc+fo" in the time period from T2 to T4, and linearly down-chirps the modulation frequency of the second modulated light from the frequency higher than "fc" to "fc−fo" in the time period from T2 to T4. That is, the modulation frequency of the first modulated light and the modulation frequency of the second modulated light are modulated to approach each other, but the chirp directions are not switched at the timing when the modulation frequency of the first modulated light and the modulation frequency of the second modulated light become the same. The chirp directions are switched when a certain time period elapses from the timing when the modulation frequency of the first modulated light and the modulation frequency of the second modulated light become the same.

In this case, the external modulator 17 can secure longer time (from T0 to T2 in FIG. 5) from the start of the modulation output to the switching of the chirp directions of the first modulated light and the second modulated light with respect to the modulation output described in FIG. 4 (from T0 to T1 in FIG. 4). Thus, the number of times the chirp directions are switched can be reduced compared in the same measurement time. The decrease in the frame rate is suppressed as the number of times the chirp directions are switched is smaller when compared in the same measurement time. Therefore, the decrease in the frame rate can be suppressed with respect to the modulation output described with reference to FIG. 4.

Figure 6:
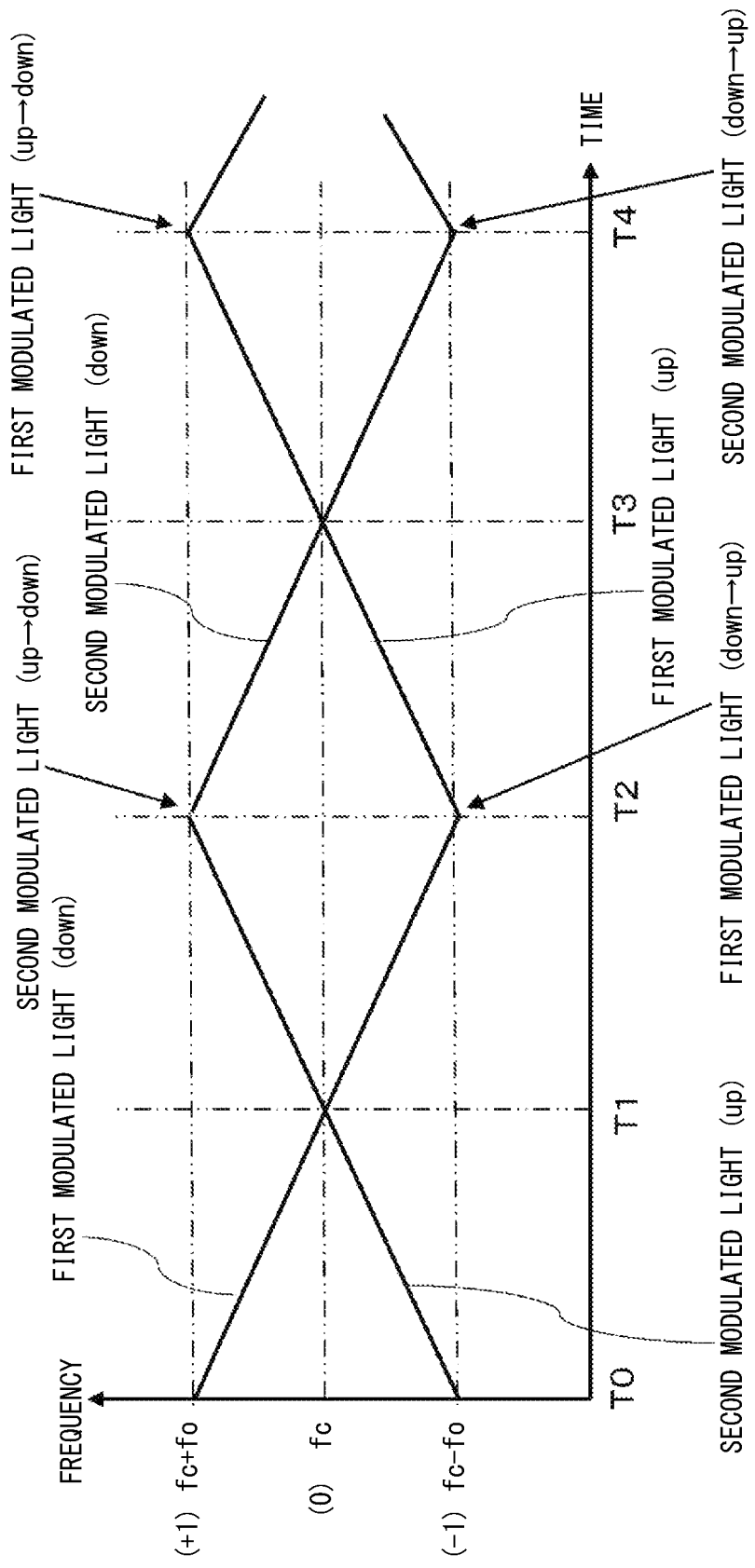
FIG. 6 is a diagram showing a change in frequency of modulated lights.

As shown in FIG. 6, the external modulator 17 linearly down-chirps the modulation frequency of the first modulated light from "fc+fo" to "fc−fo" in the time period from T0 to T2. The external modulator 17 linearly up-chirps the modulation frequency of the second modulated light from "fc−fo" to "fc+fo" in the time period from T0 to T2. After that, the external modulator 17 linearly up-chirps the modulation frequency of the first modulated light from "fc−fo" to "fc+fo" in the time period from T2 to T4, and linearly down-chirps the modulation frequency of the second modulated light from "fc+fo" to "fc−fo" in the time period from T2 to T4. The occupied frequency band of the first modulated light and the occupied frequency band of the second modulated light are the same (see FIG. 6).

In this case, the external modulator 17 can secure further longer time (from T0 to T2 in FIG. 6) from the start of the modulation output to switching the chirp directions of the first modulated light and the second modulated light, with respect to the modulation output described in FIG. 5. Therefore, the number of times the chirp directions are switched can be further reduced compared in the same measurement time. With respect to the modulation output described with reference to FIGS. 4 and 5, it is possible to further suppress decrease in the frame rate.

Figure 7:
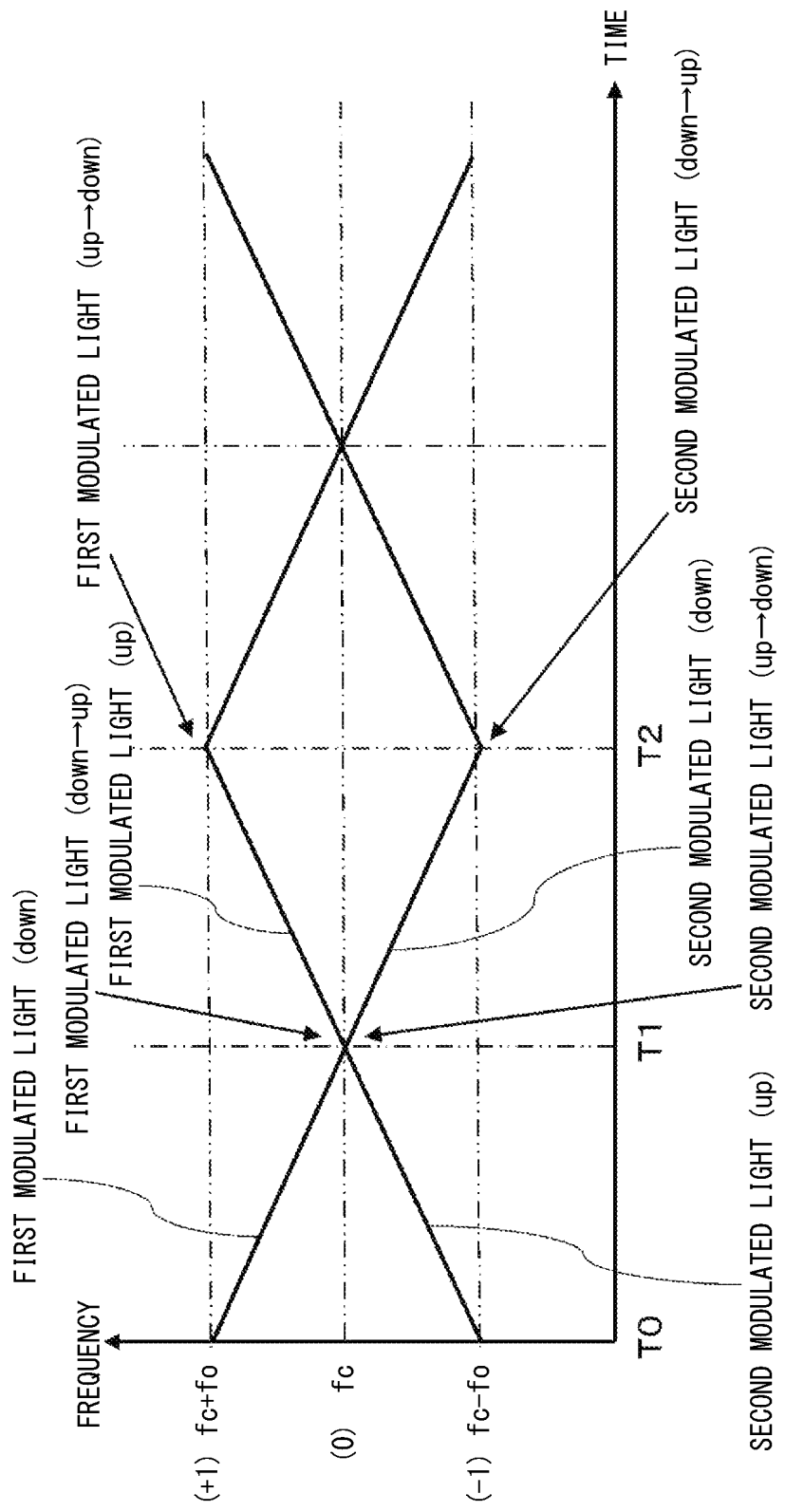
FIG. 7 is a diagram showing a change in frequency of modulated lights.

As shown in FIG. 7, the external modulator 17 linearly down-chirps the modulation frequency of the first modulated light from "fc+fo" to "fc" in the time period from T0 to T1, and linearly up-chirps the modulation frequency of the second modulated light from "fc−fo" to "fc" in the time period from T0 to T1. After that, the external modulator 17 linearly up-chirps the modulation frequency of the first modulated light from "fc" to "fc+fo" in the time period from T1 to T2, and linearly down-chirps the modulation frequency of the second modulated light from "fc" to "fc−fo" in the time period from T1 to T2. In this case, the external modulator 17 monitors the down-chirp rate of the first modulated light (T0 to T1), and controls the down-chirp rate of the second modulated light (T1 to T2) to match the monitored down-chirp rate of the first modulated light (see FIG. 7) so as to ensure linearity. Further, the external modulator 17 monitors the up-chirp rate of the second modulated light (T0 to T1), and controls the up-chirp rate of the first modulated light (T1 to T2) to match the monitored up-chirp rate of the second modulated light (see FIG. 7) so as to ensure linearity.

Figure 8:
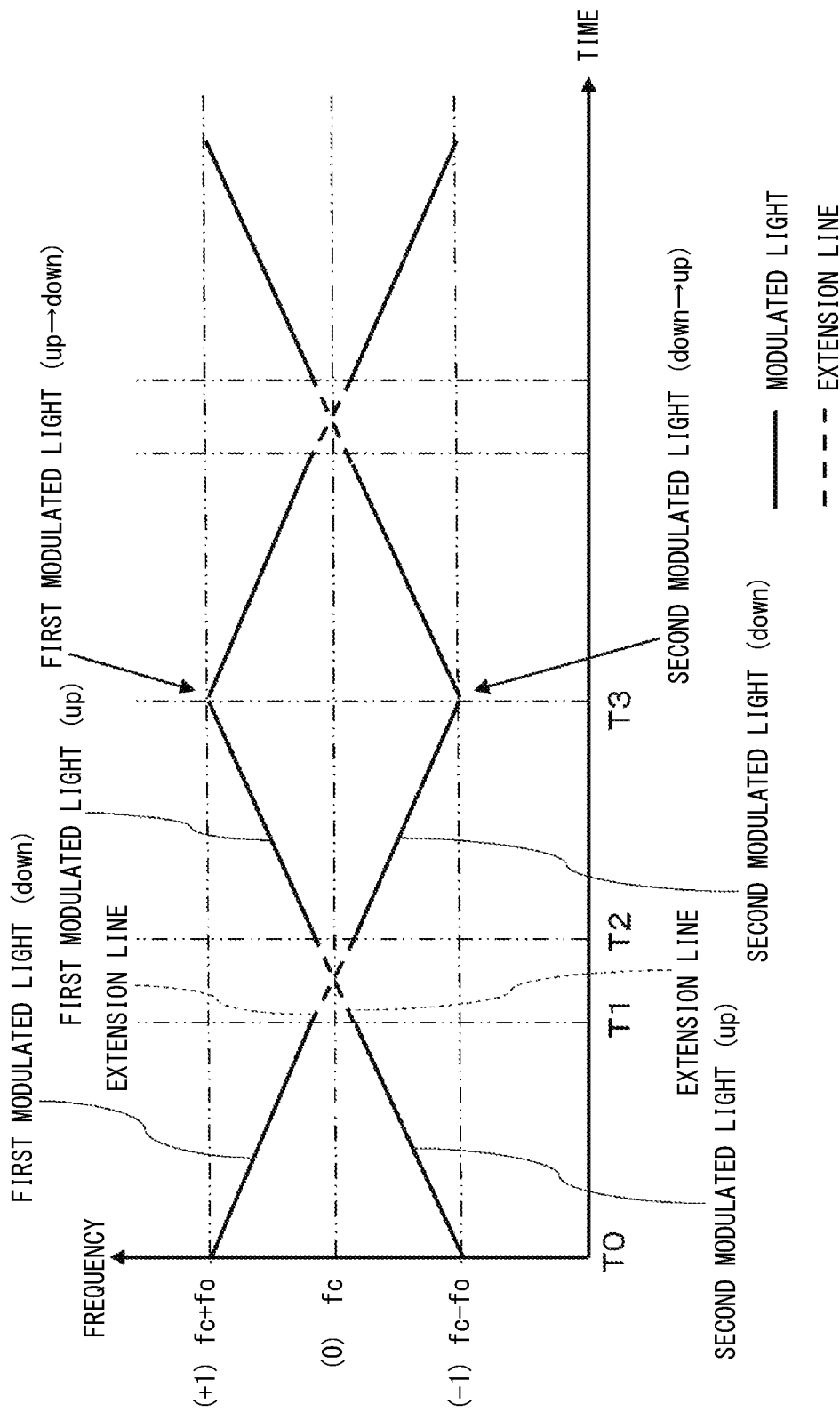
FIG. 8 is a diagram showing a change in frequency of modulated lights.

As shown in FIG. 8, the external modulator 17 linearly down-chirps the modulation frequency of the first modulated light from "fc+fo" to "fc+fo'" in the time period from T0 to T1, and linearly up-chirps the modulation frequency of the second modulated light from "fc−fo" to "fc−fo'" in the time period from T0 to T1. After that, the external modulator 17 linearly up-chirps the modulation frequency of the first modulated light from "fc+fo'" to "fc+fo" in the time period from T2 to T3 so that the up-chirp rate of the first modulation frequency of the first modulated light approaches and matches an extension line of the up-chirp rate of the modulation frequency of the second modulated light. In this case, the up-chirp rate of the modulation frequency of the first modulated light does not have to completely match the extension line of the up-chirp rate of the modulation frequency of the second modulated light, and may be close to a certain extent. Further, the external modulator 17 linearly down-chirps the modulation frequency of the second modulated light from "fc−fo'" to "fc−fo" so that the down-chirp rate of the modulation frequency of the second modulated light approaches and matches the extension line of the down-chirp rate of the modulation frequency of the first modulated light. In this case, it is not necessary that the down-chirp rate of the modulation frequency of the second modulated light completely matches with the extension line of the down-chirp rate of the modulation frequency of the first modulated light, and may be close to a certain extent.

Figure 9:
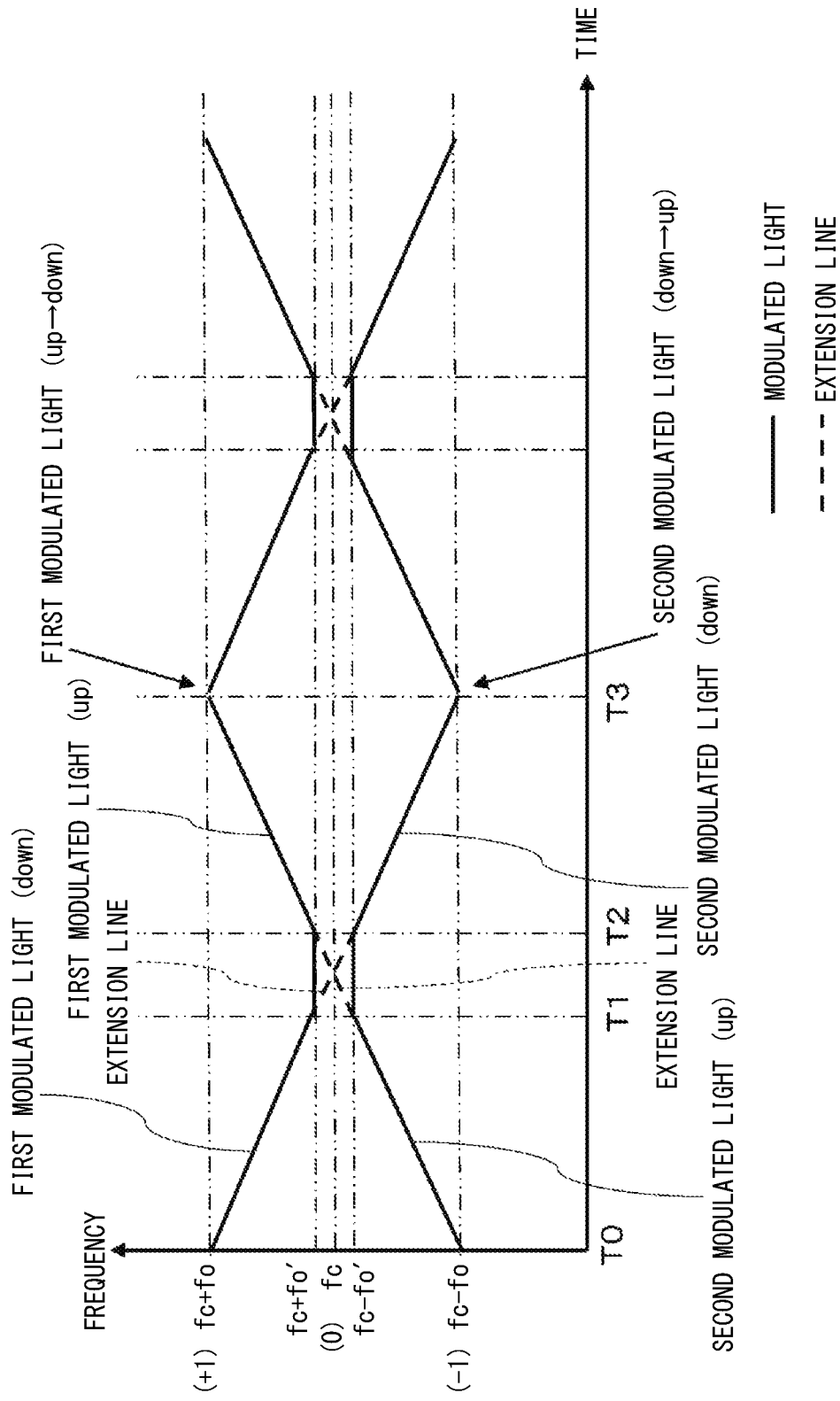
FIG. 9 is a diagram showing a change in frequency of modulated lights.

As shown in FIG. 9, the external modulator 17 linearly down-chirps the modulation frequency of the first modulated light from "fc+fo" to "fc+fo'", and linearly up-chirps the modulation frequency of the second modulated light from "fc−fo" to "fc−fo'". The external modulator 17 specifies a starting point for starting the up-chirp in the modulation frequency of the first modulated light and the down-chirp in the modulation frequency of the second modulated light based on a timing at which the down-chirp in the modulation frequency of the first modulated light and the up-chirp in the modulation frequency of the second modulated light are completed, and the down-chirp rate of the modulation frequency of the first modulated light or the down-chirp rate of the modulation frequency of the second modulated light.

That is, the external modulator 17 calculates T2 by the calculation formula of $$T2=T1+2fo'/k$$

in which T1 represents the timing at which the down-chirp in the modulation frequency of the first modulated light and the up-chirp in the modulation frequency of the second modulated light are completed, and T2 represents the timing for starting the up-chirp in the modulation frequency of the first modulated light and the down-chirp of the modulation frequency in the second modulated light.

Specifically, the starting point (T2) for starting the chirp of the one modulation frequency in the second direction and the chirp of the other modulation frequency in the first direction can be specified based on a frequency difference (2fo') when completing the chirp of the one modulation frequency in the first direction and the chirp of the other modulation frequency in the second direction and the chirp rate (k) of the one modulation frequency in the first direction or the chirp rate (k) of the other modulation frequency in the second direction.

After that, the external modulator 17 linearly up-chirps the modulation frequency of the first modulated light from "fc+fo'" to "fc+fo" in the time period from T2 to T3, so as to match with the extension line of the up-chirp rate of the modulation frequency of the second modulated light, and linearly down-chirps the modulation frequency of the second modulated light from "fc−fo'" to "fc−fo" in the time period from T2 to T3 so as to match with the extension line of the down-chirp rate of the modulation frequency of the first modulated light.

According to the second embodiment, the following effects can be obtained.

In the distance measuring device 11, the modulation frequencies are chirped to approach each other so that the modulation frequency of the first modulated light and the modulation frequency of the second modulated light become the same at the same timing, using the transmitting scanner 13, in which the emission angle of the emitted light has a frequency dependence on the input light. Further, the modulation frequencies are chirped to approach each other so that the modulation frequency of the first modulated light and the modulation frequency of the second modulated light do not become the same at the same time. Similar to the first embodiment, by increasing the distance resolution and the frame rate and suppressing the increase in the spatial resolution, it is possible to appropriately measure the distance from the own device to the target object and the speed of the target object. By flexibly controlling the chirp rate using the external modulator 17, the linearity of the chirp rate can be ensured. Further, the measurement accuracy can be improved by suppressing the output of the carrier frequency which becomes noise when measuring the distance from the own device to the target object and the speed of the target object.

Further, by ensuring a long time from the start of the modulation output to switching the chirp directions of the first modulated light and the second modulated light, it is possible to suppress a decrease in the frame rate. Further, by monitoring the chirp rate to further secure the linearity, the measurement accuracy can be further improved.

Third Embodiment

A third embodiment will be described with reference to FIGS. 10 to 14. In the vicinity of the frequency where the modulated signals overlap, a noise may be generated due to reasons other than beat signal generated by the distance.

Figure 10:
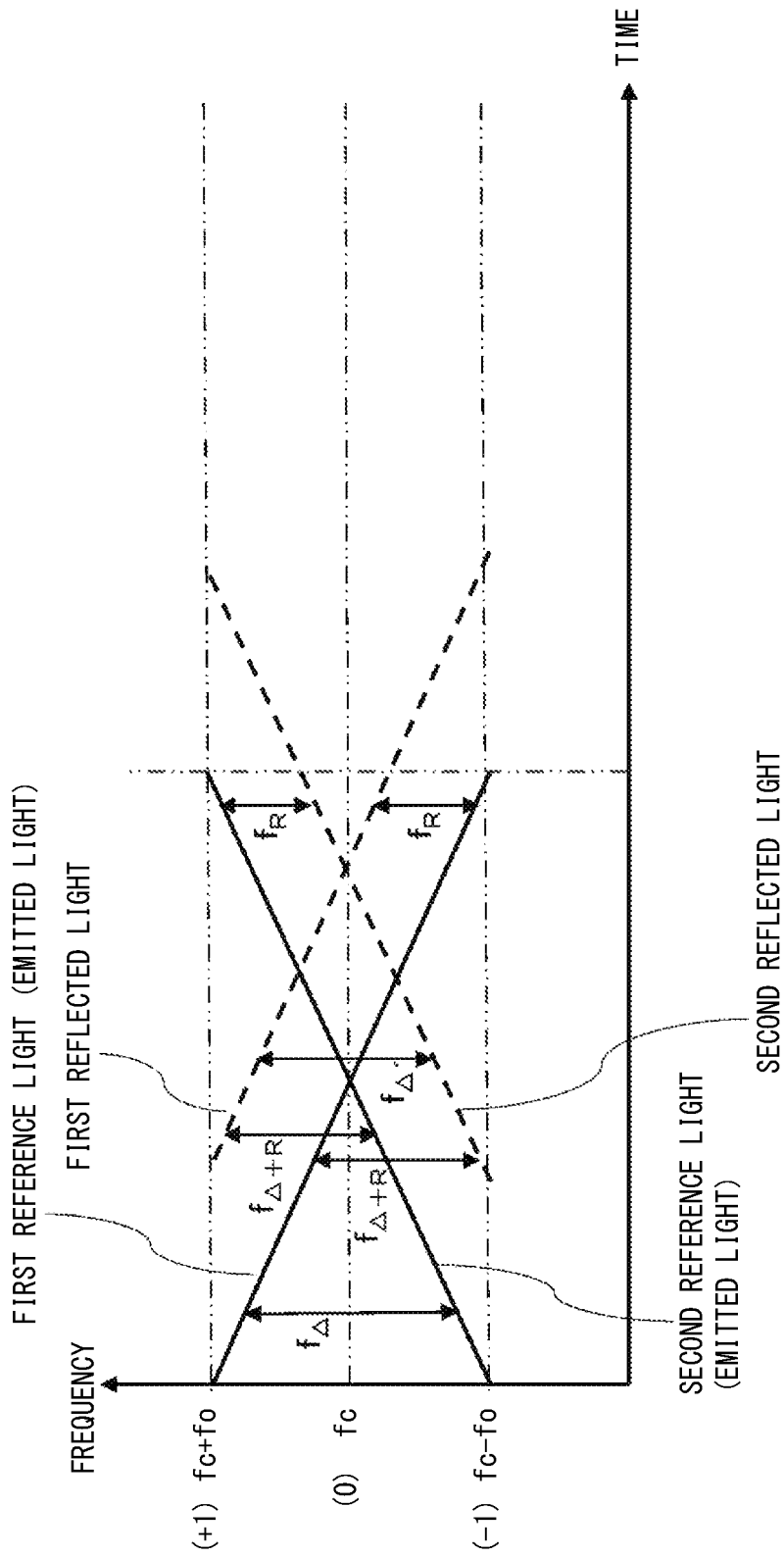
FIG. 10 is a diagram showing a change in frequency of modulated lights and reflected lights.
Figure 11:
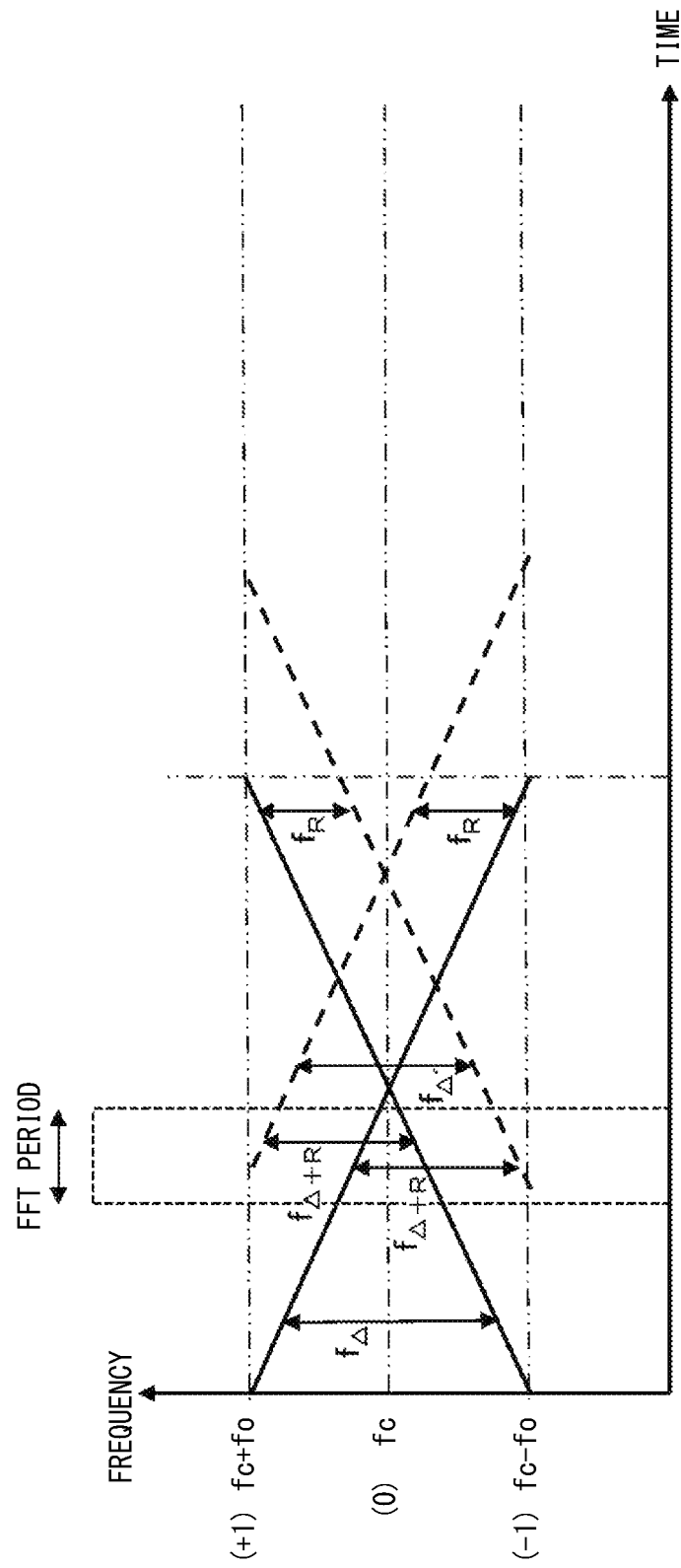
FIG. 11 is a diagram showing an FFT period.
Figure 12:
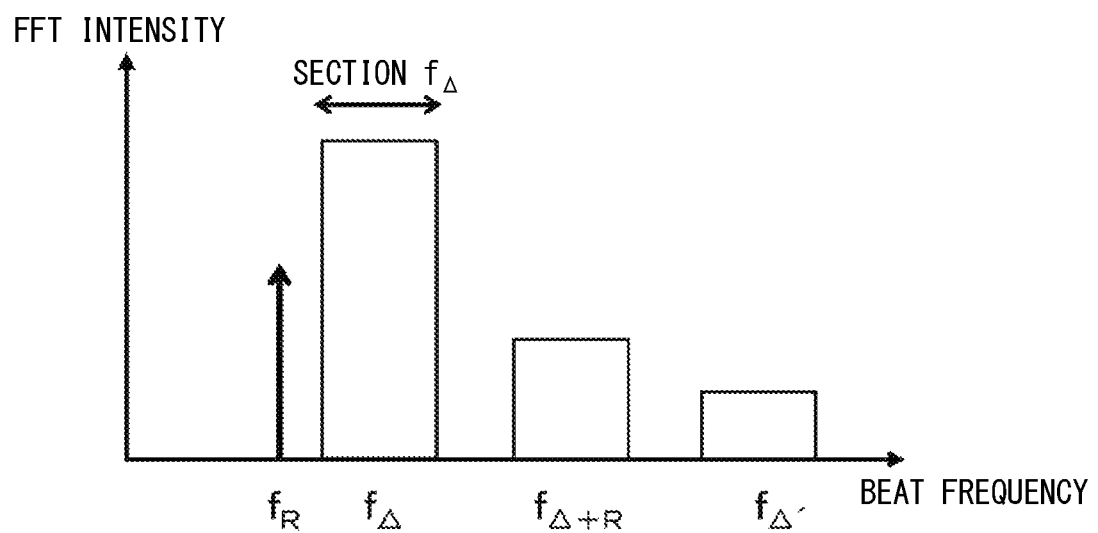
FIG. 12 is a diagram showing a relationship between a frequency of a beat signal and an FFT intensity.

That is, as shown in FIG. 10, the beat signal $f_A$ caused by the target object, the beat signal $f_A$, between the reference lights, the beat signal $f_A$, between the reflected lights, and the beat signal $f_{A+R}$ between the reference light and the other reflected light are generated. The FFT (Fast Fourier Transform) period is shown in FIG. 11. In the FFT period, as shown in FIG. 12, the FFT intensity is not the maximum at the beat signal $f_R$ caused by the target object, since the beat signal $f_A$, between the reference lights is the maximum. Therefore, the DSP 19 needs to remove the beat signal $f_A$, between the reference lights having the maximum FFT intensity. The section $f_A$, in FIG. 12 depends on the FFT period and/or the chirp rate.

Figure 13:
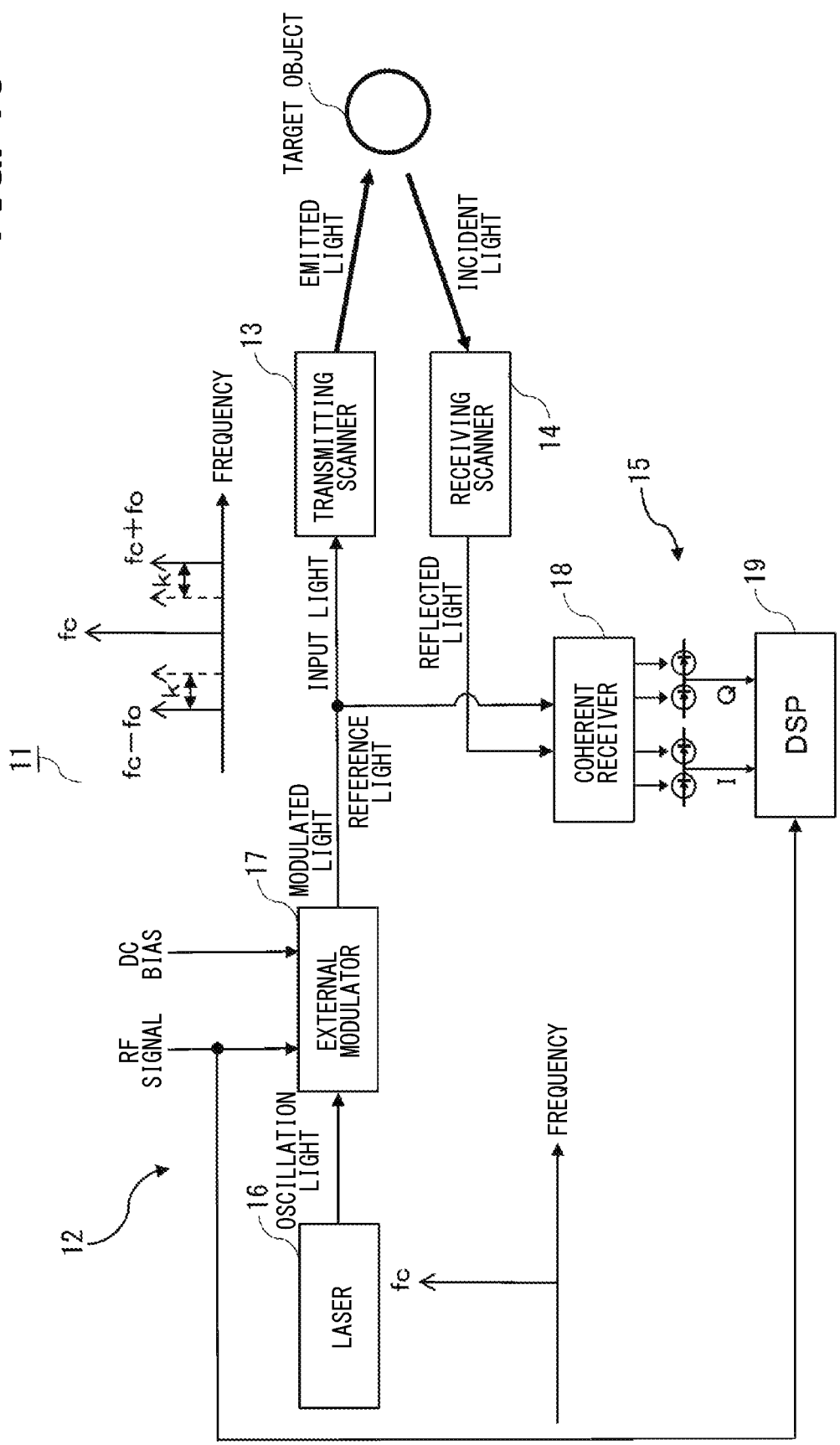
FIG. 13 is a functional block diagram showing a distance measuring device according to a third embodiment.

As shown in FIG. 13, the RF signal is input to the DSP 19, which is the same as the RF signal input to the external modulator 17 from the outside. The DSP 19 calculates the difference between the +1 order modulation frequency and the −1 order modulation frequency from the linear signal of the linear frequency modulator (LFM) for generating the RF signal. That is, the DSP 19 calculates the modulation frequency down-chirped for the first modulated light as f1=fc+fo−kt, and calculates the modulation frequency up-chirped for the second modulated light as f2=fc−fo+kt. The DSP 19 calculates the difference as f1−f2=2(fo−kt).

Figure 14:
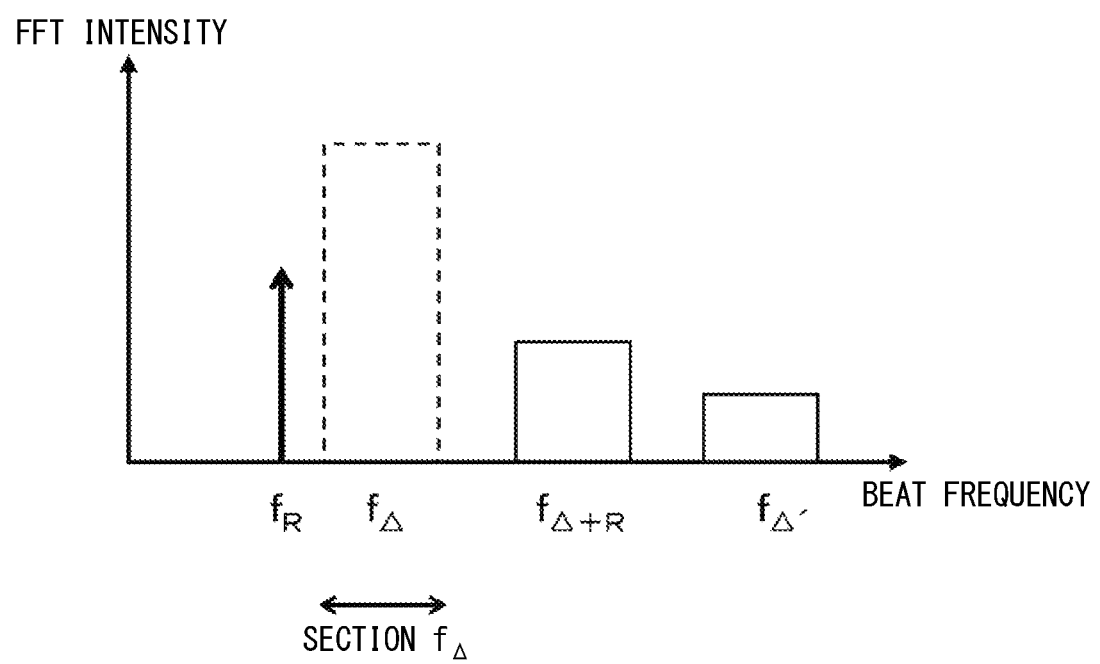
FIG. 14 is a diagram showing a relationship between a frequency of a beat signal and an FFT intensity.

The DSP 19 ignores the calculated frequency band in the FFT result after the coherent detection, for example, by multiplying it by zero. Thus, the section $f_A$, in FIG. 14 corresponding to 2(fo−kt) is ignored. As shown in FIG. 14, the peak of the beat signal $f_A$ caused by the target object can be the maximum. The distance from the own device to the target object and the speed of the target object can be appropriately measured by maximizing the peak of the beat signal $f_A$ caused by the target object.

According to the third embodiment, the beat signal $f_A$, between the reference lights having the maximum FFT intensity is removed. The distance from the own device to the target object and the speed of the target object can be appropriately measured by maximizing the peak of the beat signal $f_A$ caused by the target object.

Fourth Embodiment

A fourth embodiment will be described with reference to FIGS. 15 to 16.

Figure 15:
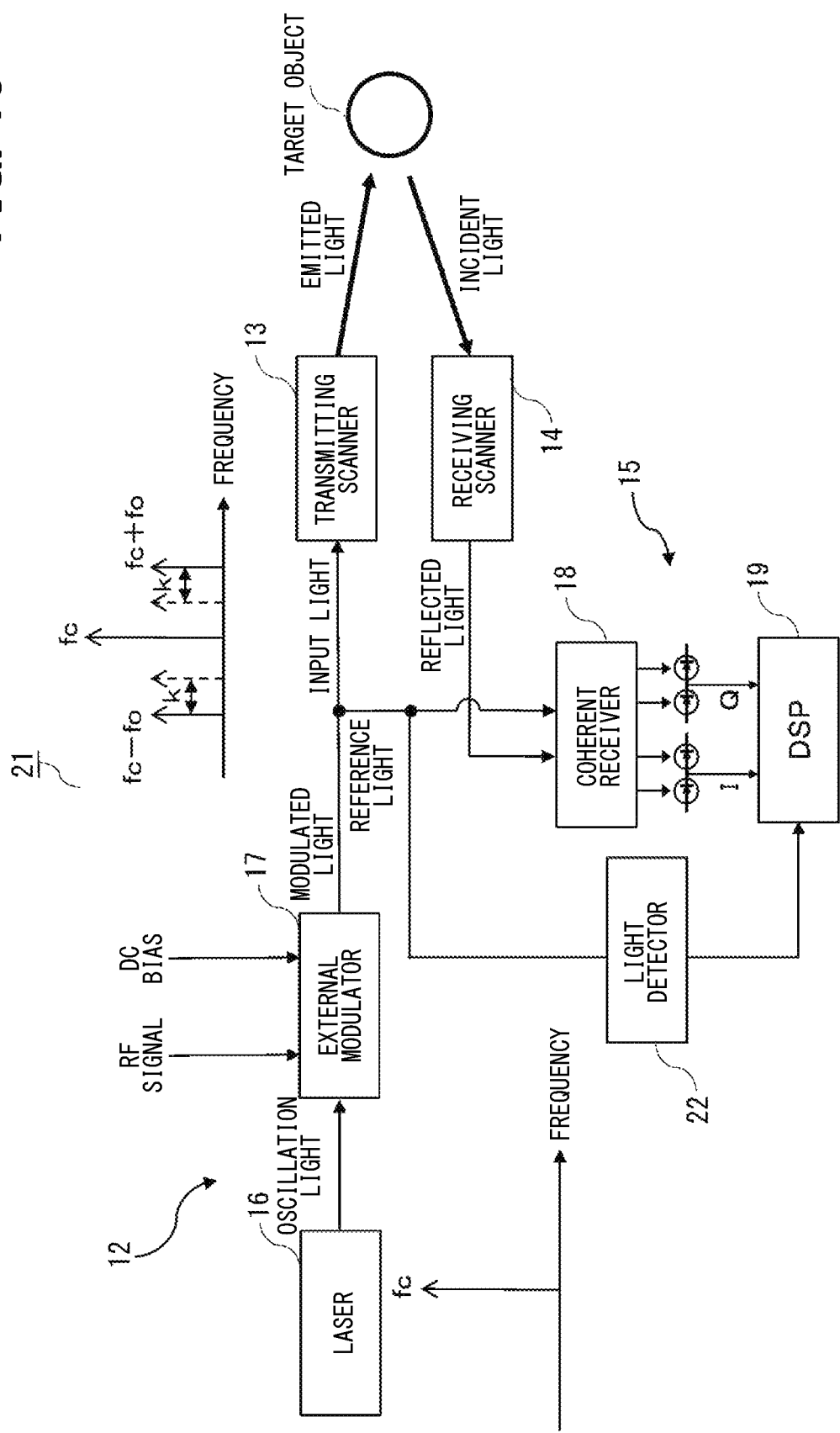
FIG. 15 is a functional block diagram showing a distance measuring device according to a fourth embodiment.
Figure 16:
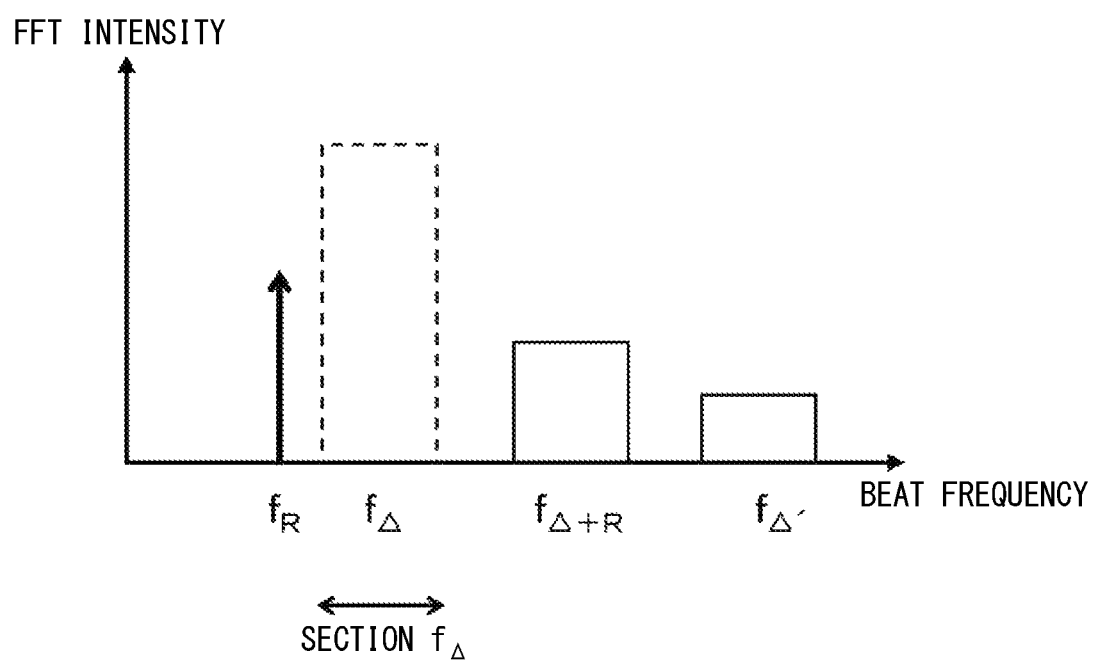
FIG. 16 is a diagram showing a relationship between a frequency of a beat signal and an FFT intensity.

As shown in FIG. 15, the distance measuring device 21 includes a light detector 22 that monitors the reference light in addition to the configuration described in the second embodiment. The modulated light output from the external modulator 17 is branched into an input light and a reference light. The reference light is input to the coherent receiver 18 and the light detector 22. The DSP 19 detects the beat signal $f_A$, between the reference lights with respect to the +1 order frequency and the −1 order frequency from the signal input from the light detector 22. The DSP 19 subtracts the detected beat signal from the measurement result after the coherent detection, and performs the FFT treatment to remove the beat signal $f_A$, between the reference lights. Thus, as shown in FIG. 16, the peak of the beat signal $f_A$ caused by the target object is maximized. In this case as well, the distance from the own device to the target object and the speed of the target object can be appropriately measured by maximizing the peak of the beat signal $f_A$ caused by the target object.

According to the fourth embodiment, as in the third embodiment, the distance from the own device to the target object and the speed of the target object can be appropriately measured by maximizing the peak of the beat signal $f_A$ caused by the target object.

Other Embodiment

Although the present disclosure has been described in accordance with the embodiments, it is understood that the present disclosure is not limited to such examples or structures. The present disclosure encompasses various modifications and variations within the scope of equivalents. Furthermore, various combinations and formations, and other combinations and formations including one, more than one or less than one element may be included in the scope and the spirit of the present disclosure.

Figure 17:
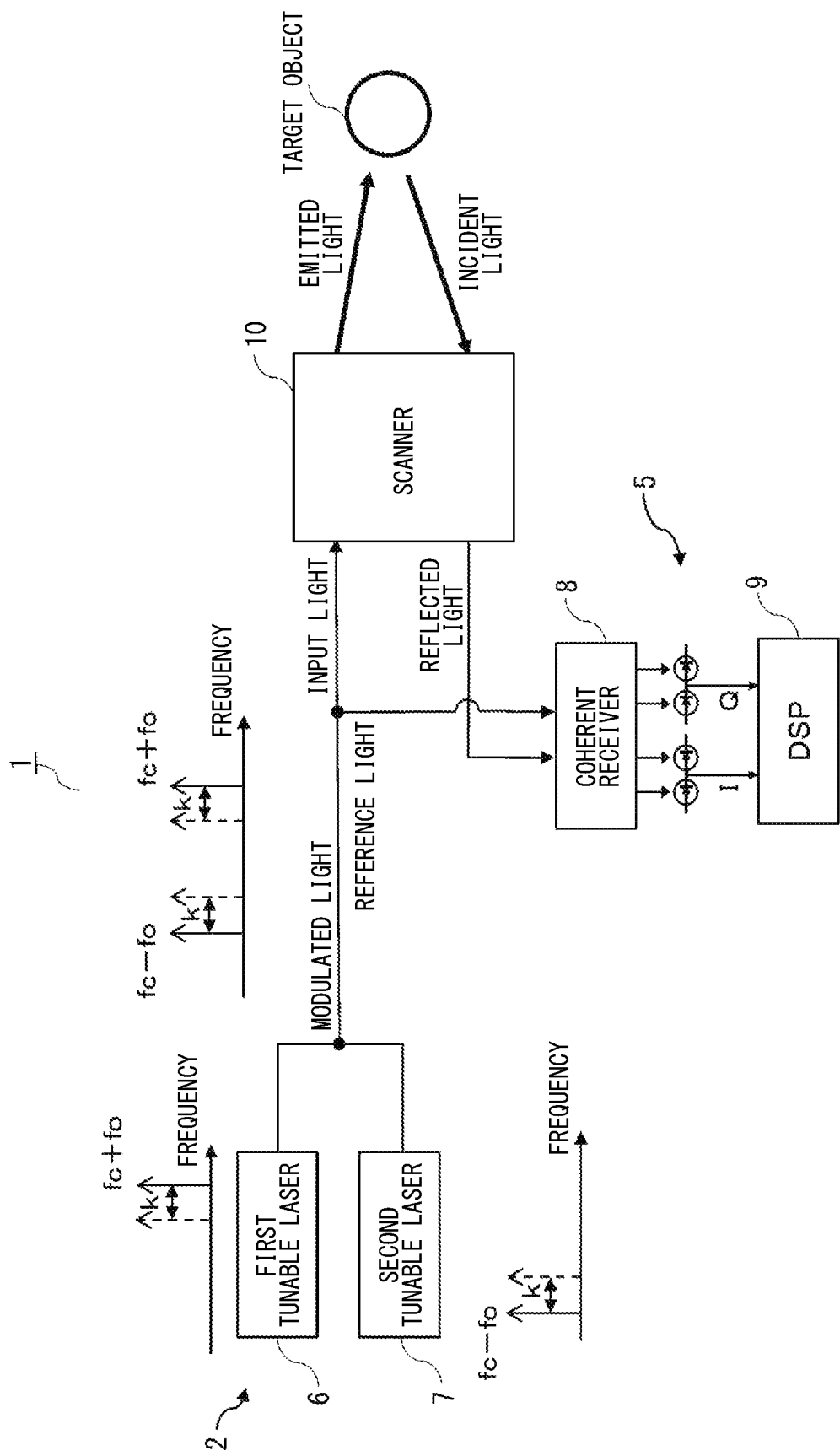
FIG. 17 is a functional block diagram showing a distance measuring device according to a modification of the first embodiment.
Figure 18:
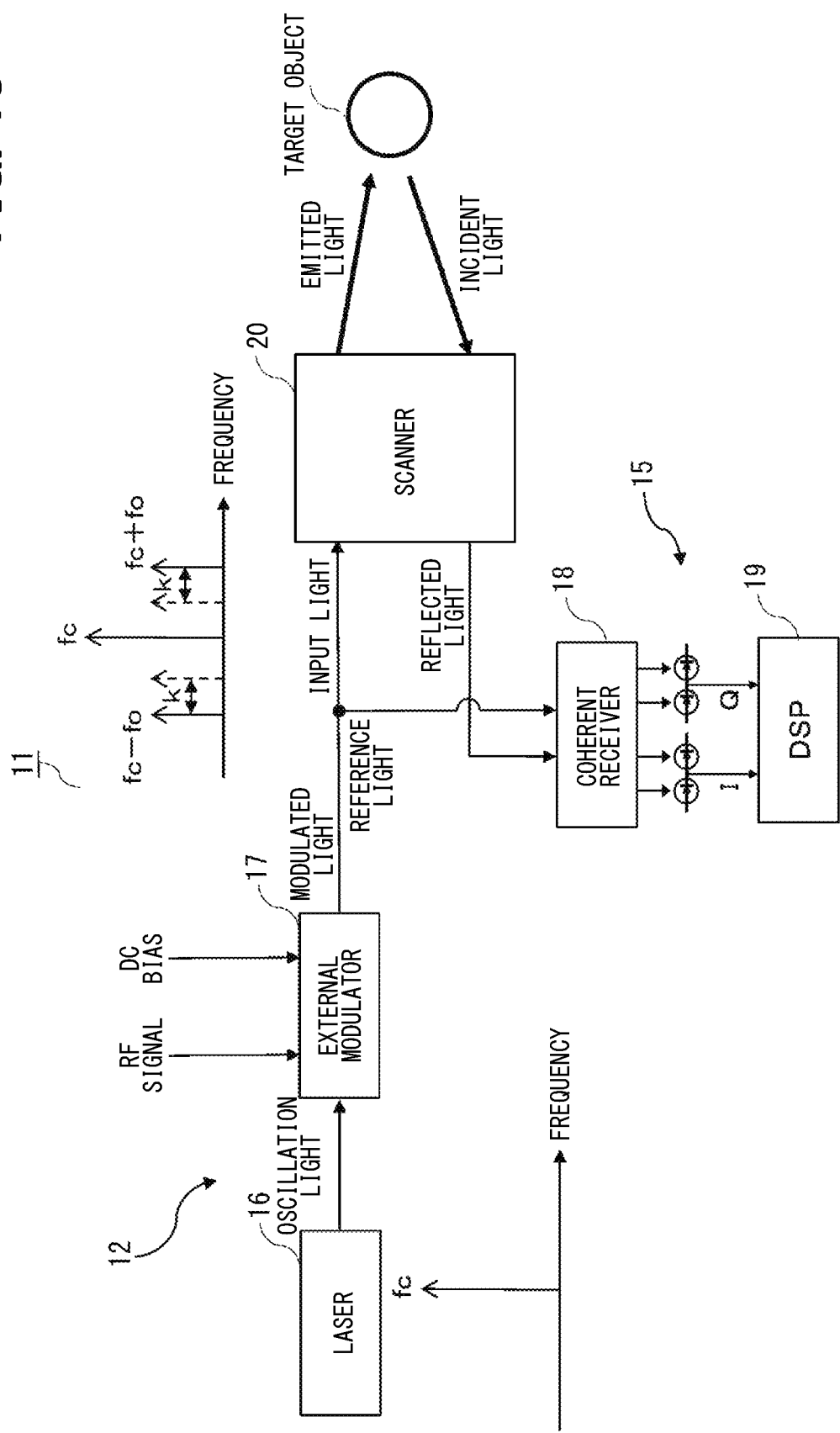
FIG. 18 is a functional block diagram showing a distance measuring device according to a modification of the second embodiment.

Although the OPA is exemplified as a scanner having frequency dependence, the scanner may be a surface acoustic wave (SAW) device, prism, or liquid crystal display. The transmitting scanner and the receiving scanner are illustrated as having different configurations. Alternatively, the transmitting scanner 3 and the receiving scanner 4 may be made of one scanner 10 (see FIG. 17), and the transmitting scanner 13 and the receiving scanner 14 may be made of one scanner 20 (see FIG. 18). For example, a circulator is provided between the modulated light output unit and the scanner, and the circulator separates the input light and the reflected light from each other.

What is claimed is:

1. A distance measuring device comprising:
   a modulated light output unit configured to output a modulated light;
   a transmitting scanner configured to emit an input light, which is one branched light of the modulated light, as an emitted light;
   a receiving scanner into which the emitted light reflected by a target object is incident as an incident light, the receiving scanner outputting the incident light as a reflected light; and
   a measuring unit configured to measure a distance to the target object by combining the reflected light and a reference light which is an other branched light of the modulated light, wherein
   the transmitting scanner has frequency dependence in which an emission angle of the emitted light depends on a frequency of the input light,
   the modulated light output unit outputs at least two modulated lights having modulation frequencies different from each other by chirping the modulation frequencies to approach each other so that the modulation frequencies become a same at a same time,
   the reference light comprises at least two reference lights of the at least two modulated lights, and
   the measuring unit calculates a beat signal generated by interference between the at least two reference lights, and removes the beat signal so as to measure a distance to the target object.

2. The distance measuring device according to claim 1, wherein
   the modulated light output unit outputs the at least two modulated lights so that occupied frequency bands of the at least two modulated lights are the same.

3. The distance measuring device according to claim 1, wherein
   the modulated light output unit outputs the at least two modulated lights, when switching chirp directions of the modulation frequencies of the at least two modulated lights,
   so that a chirp rate of one modulation frequency in a first direction matches a chirp rate of an other modulation frequency in the first direction, and
   so that a chirp rate of the other modulation frequency in a second direction matches a chirp rate of the one modulation frequency in the second direction.

4. The distance measuring device according to claim 1, wherein
   the modulated light output unit includes at least two tunable lasers and outputs modulated lights from the at least two tunable lasers.

5. The distance measuring device according to claim 1, wherein
   the modulated light output unit includes
   a laser light source that outputs an oscillating light, and
   an external modulator that externally modulates the oscillating light output from the laser light source, and
   the modulated light output unit outputs the modulated light from the external modulator.

6. The distance measuring device according to claim 1, further comprising:
   a light detector configured to monitor the reference light, wherein
   the measuring unit calculates the beat signal generated by interference between the at least two reference lights by monitoring the reference light by the light detector.

7. The distance measuring device according to claim 1, wherein
   the transmitting scanner and the receiving scanner are formed of one scanner.

8. A distance measuring device comprising:
   a modulated light output unit configured to output a modulated light;
   a transmitting scanner configured to emit an input light, which is one branched light of the modulated light, as an emitted light;
   a receiving scanner into which the emitted light reflected by a target object is incident as an incident light, the receiving scanner outputting the incident light as a reflected light; and
   a measuring unit configured to measure a distance to the target object by combining the reflected light and a reference light which is an other branched light of the modulated light, wherein
   the transmitting scanner has frequency dependence in which an emission angle of the emitted light depends on a frequency of the input light,
   the modulated light output unit outputs at least two modulated lights having modulation frequencies different from each other by chirping the modulation frequencies to approach each other so that the modulation frequencies do not become a same at a same time,
   the reference light comprises at least two reference lights of the at least two modulated lights, and
   the measuring unit calculates a beat signal generated by interference between the at least two reference lights, and removes the beat signal so as to measure a distance to the target object.

9. The distance measuring device according to claim 8, wherein
   the modulated light output unit outputs the at least two modulated lights, when switching chirp directions of the modulation frequencies of the at least two modulated lights, so that one modulation frequency chirped in a first direction approaches an extension line of an other modulation frequency chirped in the first direction, and so that the other modulation frequency chirped in a second direction approaches an extension line of the one modulation frequency chirped in the second direction.

10. The distance measuring device according to claim 9, wherein the modulated light output unit outputs the at least two modulated lights, so that a chirp rate of the one modulation frequency chirped in the first direction matches a chirp rate of the other modulation frequency chirped in the first direction, and so that a chirp rate of the other modulation frequency chirped in the second direction matches a chirp rate of the one modulation frequency chirped in the second direction.

11. The distance measuring device according to claim 9, wherein the modulated light output unit specifies a starting point for starting a chirp of the one modulation frequency in the second direction and a chirp of the other modulation frequency in the first direction based on a frequency difference when completing the chirp of the one modulation frequency in the first direction and the chirp of the other modulation frequency in the second direction and a chirp rate of the one modulation frequency in the first direction or a chirp rate of the other modulation frequency in the second direction.

* * * * *